Feb. 25, 1958 H. FISCHER 2,824,663
DEVICE FOR REPAIRING DAMAGED PLACES IN
THE WALLS OF METALLIC CONTAINERS
Filed March 5, 1957 2 Sheets-Sheet 1
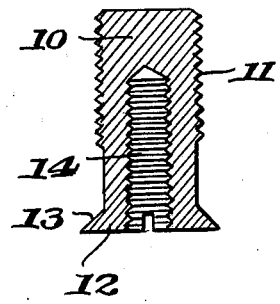
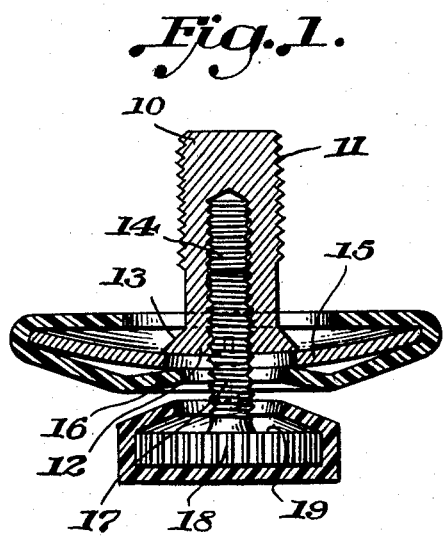
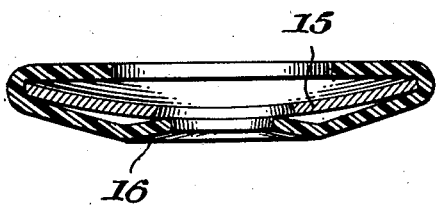
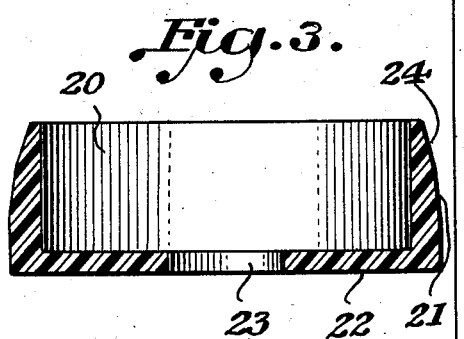
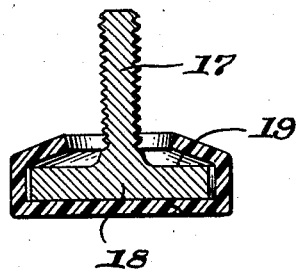
HEINZ FISCHER
INVENTOR.
BY Wenderoth, Lind & Ponack
ATTYS.

Feb. 25, 1958 H. FISCHER 2,824,663
DEVICE FOR REPAIRING DAMAGED PLACES IN
THE WALLS OF METALLIC CONTAINERS
Filed March 5, 1957 2 Sheets-Sheet 2
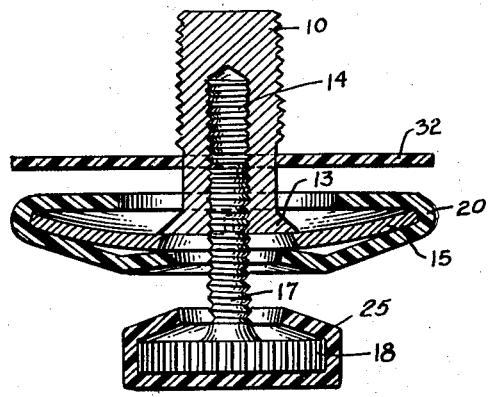
HEINZ FISCHER
INVENTOR.
BY Wenderoth, Lind & Ponack
ATTYS.

United States Patent Office 2,824,663
Patented Feb. 25, 1958

2,824,663

DEVICE FOR REPAIRING DAMAGED PLACES IN THE WALLS OF METALLIC CONTAINERS

Heinz Fischer, Basel, Switzerland, assignor to J. R. Geigy A.-G., Basel, Switzerland Application March 5, 1957, Serial No. 643,965

Claims priority, application Switzerland March 8, 1956

5 Claims. (Cl. 220—39)

This invention relates to a device for repairing damaged places in the walls of metallic containers which have corrosion-proof, especially acid-proof or acid resistant coatings thereon.

The usual means of repairing damaged places on the walls of such containers is to place a patching device over the damaged place. Many forms of such devices have been proposed, all having the principal drawback that they are made of the same material as the wall of the container and are therefore either of expensive material or are expensive to make, or they are subject to the attack of the acid materials to be contained within the containers.

It is an object of the present invention to provide a device for repairing damaged places in the walls of corrosion-proof, especially acid-proof or acid resistant containers which is acid-proof and is inexpensive to make and is quickly, easily and securely attached to the damaged place on the wall of the container.

Other and further objects of this invention will be apparent from the following specification and claims and the accompanying drawings, in which:

Fig. 1 is a sectional elevation view of the device according to the invention prior to its application to a damaged part of the wall of a container;

Fig. 2 is an exploded view of the device as shown in Fig. 1;

Fig. 3 is an enlarged sectional view of the synthetic plastic cover for the washer of the device of Fig. 1 before its application to the washer of Fig. 1;

Fig. 4 is an enlarged sectional view of the synthetic bolt head cover for the bolt of the device of Fig. 1 before its application to the washer of Fig. 1;

Fig. 5 is a view similar to that of Fig. 1 of a modified form of the device; and Fig. 6 is an enlarged partial sectional view of the device of Fig. 1 as it is applied to the damaged wall of a container.

Referring now to the figures, there is shown in Fig. 1 a device comprising a plug in the form of a flat headed screw 10 having threads 11 on one end thereof and a flat head 12 on the other end. The under side of the head 12 is beveled, as at 13, and there is a threaded axial bore 14 in the screw 10 extending axially from the flat head 12.

Around the screw 10 is a cap in the form of a dished washer 15. There is a central aperture 16 in the dished washer 15, and the edges of the aperture 16 are beveled to receive the beveled underside of the head 12 of the screw 10.

Threadable into the axial bore 14 is a securing bolt 17 with a head 18 having a substantially flat underside at 19.

All of these parts of the device may be of a relatively inexpensive metal such as iron, steel, acid resistant steel or brass. These metals consist of or contain mainly the metals Cr (atomic weight 52), Fe (55.8), Ni (58.7), Cu (63.6) and Zn (65.4). The metals Mn (54.9) and Co (58.9) may also be present in metal alloys used. The metals used are therefore characterised by an atomic weight between 52 and 66.

It need not be made of an expensive metal such as tantalum, with which the container itself may be coated to make it acid-proof or acid resistant. Likewise the parts need not be enameled so that no metal parts are left exposed when the device is in the operative position.

Over the dished washer is a cover 20 which is formed of acid-proof synthetic plastic, a plastic, for instance, consisting of tetrafluorethylene polymer, available under the trademark "Teflon." This cover 20 is formed as shown in Fig. 3 as a collar 21 with an end 22 having an aperture 23 therein. The outside edge of the collar 21 may be slightly beveled as at 24. The cover 20 is applied to the dished washer 15 with the aperture 23 over the aperture 16 and the end 22 on the convex side of the dished washer 15. The collar 21 is then bent inwardly around the periphery of the washer 15, the beveled edge of the collar 21 terminating short of the aperture 16 in the washer 15.

A similar but smaller cover 25 also of synthetic plastic is provided for the head 18 of the securing bolt 17. This too is formed as seen in Fig. 4 as a collar 26 with an end 27. No aperture is provided in end 27, however. The outside edge of the collar 26 may be beveled as at 28. The cover is applied over the head 18 of the bolt 17 and the beveled edge of the collar is bent inwardly under the head 18.

To apply the device to the wall of a container, the damaged place is first cleaned, ground down to the sound base metal, and the wall bored and internally threaded to receive the screw 10. The screw 10 has the dished washer 15 covered with the cover 20 placed over it with the concave side toward the wall of the container. The area of the wall of the container around the threaded bore is coated with an acid resistant or acid-proof cement 30. The screw 10 is then tightened down against the covered washer 15 with the beveled underside 13 against the beveled edge of aperture 16 until the edge 24 of the cover 20 is firmly seated in the cement 30 against the wall of the container. The covered bolt 17 is then started into the threaded axial bore 14. The edge of the aperture 23 in the cover 20 for the washer 15 is then coated with an acid-proof or acid resistant cement 31 and the bolt 17 then tightened down until the edge of the cover 25 is seated firmly in the cement 31. The device now appears as in Fig. 6. None of the metal surfaces of the parts of the device are exposed, the only exposed surfaces being either the synthetic plastic or the acid-proof cement.

In the modified form of the device as shown in Fig. 5, there is provided an additional washer 32 of the synthetic plastic. This washer is placed around the screw 10 between the covered dished washer 15 and the wall of the container. It is large enough so that the edges thereof are clamped between the wall of the container and the outside edge of the dished washer 15 when the device is applied.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. A device for repairing damaged places in the walls of metallic containers having a corrosion-proof coating thereon comprising a flat headed screw, said screw having a threaded axial bore therein extending axially from the head of said screw, a dished apertured washer through which said screw extends from the convex side of said washer, the underside of the head of said screw being beveled and the edge of said aperture in said dished washer being beveled to receive the screw head, a headed securing bolt having a flat underside on the head thereof threadable into said threaded axial bore, said screw, washer and bolt being of metal, said metal consisting as its essential part of at least one metal of the metallic elements with an atomic weight between 52 and 66, an apertured cover over said washer with the aperture therein aligned with the aperture in said washer and having an edge bent around the edge of said washer and lying against the concave side of said washer, and a cover over the head of said bolt with an edge lying against the underside of the head of said bolt, said covers being of an acid-proof synthetic plastic.

2. A device as claimed in claim 1 in which said synthetic plastic is tetrafluorethylene polymer.

3. A device as claimed in claim 1 in which the metal of said screw, washer and bolt is acid resistant steel.

4. A device as claimed in claim 1 and a flat apertured washer of acid-proof synthetic plastic on said screw against the concave side of said dished washer.

5. A device as claimed in claim 1 and a layer of acid-proof cement on the concave side of said dished washer and the edge of the cover over said dished washer lying against the concave side, and a layer of acid-proof cement between the cover over said washer and the edge of the cover over the head of said bolt lying against the flat underside of said head of said bolt.

References Cited in the file of this patent
UNITED STATES PATENTS

| | | |
|---|---|---|
| 1,171,098 | Dalton | Feb. 8, 1916 |
| 2,726,009 | Murdock Sr. et al. | Dec. 6, 1955 |